(12) United States Patent
Zhong

(10) Patent No.: US 11,761,694 B2
(45) Date of Patent: Sep. 19, 2023

(54) DIGITAL CONTROLLED SOLENOID CAPILLARY TUBE METERING DEVICES OF REFRIGERATION SYSTEMS

(71) Applicant: Lei Zhong, Mokena, IL (US)

(72) Inventor: Lei Zhong, Mokena, IL (US)

( * ) Notice: Subject to any disclaimer, the term of this patent is extended or adjusted under 35 U.S.C. 154(b) by 0 days.

(21) Appl. No.: 17/728,700

(22) Filed: Apr. 25, 2022

(65) Prior Publication Data

US 2022/0316774 A1     Oct. 6, 2022

Related U.S. Application Data

(63) Continuation of application No. 16/672,371, filed on Nov. 1, 2019, now Pat. No. 11,313,598.

(51) Int. Cl.
| | |
|---|---|
| *F25B 41/31* | (2021.01) |
| *G05D 23/19* | (2006.01) |
| *F25B 41/20* | (2021.01) |
| *F25B 41/345* | (2021.01) |

(52) U.S. Cl.
CPC ............. *F25B 41/31* (2021.01); *F25B 41/20* (2021.01); *G05D 23/1917* (2013.01); *G05D 23/1919* (2013.01); *F25B 41/347* (2021.01); *F25B 2341/062* (2013.01)

(58) Field of Classification Search
CPC ........ F25B 41/31; F25B 41/20; F25B 41/347; F25B 2341/062; F25B 2700/2104; F25B 2700/21163; F25B 2600/2513; F25B 41/37; F25B 41/345; F25B 41/39
See application file for complete search history.

(56) References Cited

U.S. PATENT DOCUMENTS 6,367,283 B1 * 4/2002 Enderle ................. F25B 41/345
62/511

* cited by examiner

*Primary Examiner* — Kun Kai Ma
(74) *Attorney, Agent, or Firm* — Erickson Law Group, PC

(57) ABSTRACT

A refrigeration system includes a compressor; a condenser; an expansion valve having a body with an expansion valve inlet and an expansion valve outlet; an evaporator all arranged in a refrigeration circuit; and a controller. The expansion valve body has a pathway comprising an inlet body capillary tube flow-connected to the expansion valve inlet, and an outlet body capillary tube flow-connected to the expansion valve outlet. The expansion valve comprises a solenoid operated valve element that is selectively positionable between the inlet body capillary tube outlet and the outlet body capillary tube inlet. The controller digitally controls the valve element to position the valve element either to allow flow through the pathway in an open position or to block flow through the pathway in a closed position.

14 Claims, 5 Drawing Sheets

DIGITAL CONTROLLED SOLENOID CAPILLARY TUBE METERING DEVICES OF REFRIGERATION SYSTEMS

This application is a continuation of U.S. Ser. No. 16/672,371, filed Nov. 1, 2019.

BACKGROUND OF THE INVENTION

The present invention is directed to refrigeration systems, particularly to an improved mechanical refrigeration system.

A conventional mechanical refrigeration system 20 is shown in FIG. 4. The refrigeration system comprises a compressor 24, a condenser 26 having a condenser coil 27, a metering device 28 such as an expansion valve, and an evaporator 30 having an evaporator coil 32. Refrigerant gas is drawn into the compressor at point J, is compressed at point A and delivered into the condenser coil at point B. Air can be blown over the condenser coil, or simply ambient air surrounds the condenser coil, wherein the air absorbs heat from the refrigerant within the coil and the refrigerant is thus cooled. The refrigerant gas is condensed into a liquid within the condenser. The liquid refrigerant from the condenser is subcooled and delivered into the metering device at point F and then enters into the evaporator at point G. In the evaporator 30, air is typically blown over the evaporator coil, or simply ambient air surrounds the evaporator coil 32. The air is cooled as the refrigerant within the coil 32 absorbs heat from the air and the liquid refrigerant thus vaporizes (boils) into a gas. The refrigerant gas is drawn into the compressor at point J, defining a complete cycle of refrigerant flow.

The metering device 28 is typically in the form of an expansion valve or a capillary tube.

The present inventor has recognized that it would be desirable to provide a refrigeration system with an improved metering device to reduce refrigeration system cost and increase energy efficiency.

SUMMARY

A refrigeration system includes a compressor; a condenser; an expansion valve having a body with an expansion valve inlet and an expansion valve outlet; an evaporator; and a controller.

An outlet of the compressor is flow-connected to an inlet of the condenser, an outlet of the condenser is a flow-connected to the expansion valve inlet, the expansion valve outlet is flow-connected to an inlet of the evaporator, and an outlet of the evaporator is flow-connected to an inlet of the compressor.

According to one embodiment, the expansion valve body has a pathway comprising an inlet body tube flow-connected to the expansion valve inlet, and an outlet body tube flow-connected to the expansion valve outlet, wherein the inlet body tube has an inlet body tube outlet and the outlet body tube has an outlet body tube inlet. The expansion valve comprises a valve element that is selectively positionable between the inlet body tube outlet and the outlet body tube inlet, wherein the controller controls the valve element to position the valve element to allow flow through the pathway in an open position or to block flow through the pathway in a closed position.

The pathway further comprises a valve seat that is comprised of an inlet seat tube, and an outlet seat tube, and the inlet body tube outlet is spaced from the inlet of the inlet seat tube by a first gap, and the outlet of the outlet seat tube is spaced from the outlet body tube inlet by a second gap.

The body can comprise a first chamber open to the first gap and a second chamber open to the second gap.

The expansion valve can comprise a solenoid actuator connected to the valve element, and the valve element is movable in a linear direction from the open and closed positions by the solenoid actuator.

According to another aspect an improved expansion valve for a refrigeration system includes a body with an expansion valve inlet and an expansion valve outlet. The body has a pathway comprising an inlet body tube flow-connected to an expansion valve inlet, and an outlet body tube flow-connected to an expansion valve outlet. The inlet body tube has an inlet body tube outlet and the outlet body tube has an outlet body tube inlet. The expansion valve can comprise a valve element that is selectively positionable between the inlet body tube outlet and the outlet body tube inlet, to allow flow through the pathway in an open position or to block flow through the pathway in a closed position.

An exemplary embodiment of the invention provides that the expansion valve is a new type of metering device, a digitally controlled solenoid-capillary tube metering device, such as a digitally controlled solenoid-capillary tube expansion valve, or DCSCEV, which can be used in refrigeration systems.

The pathway can further comprise a valve seat that is comprised of an inlet seat tube, and an outlet seat tube, and the inlet body tube outlet is spaced from the inlet of the inlet seat tube by a first gap, and the outlet of the outlet seat tube is spaced from the outlet body tube inlet by a second gap. The body can comprise a first chamber having a flow cross section much greater than a cross section of the first body tube, open to the first gap and a second chamber having a flow cross section much greater than a cross section of the second body tube open to the second gap.

The expansion valve can comprise a solenoid actuator connected to the valve element, and the valve element is movable in a linear direction from the open and closed positions by the solenoid actuator.

Another embodiment of the invention provides a refrigeration system, including a compressor; a condenser; an expansion valve having a body with an expansion valve inlet and an expansion valve outlet; an evaporator; and a controller.

An outlet of the compressor is flow-connected to an inlet of the condenser, an outlet of the condenser is a flow-connected to the expansion valve inlet, the expansion valve outlet is flow-connected to an inlet of the evaporator, and an outlet of the evaporator is flow-connected to an inlet of the compressor.

The expansion valve body has a pathway comprising a restriction flow-connected to the expansion valve inlet, and to the expansion valve outlet. The expansion valve comprises a valve element that is selectively positionable between the expansion valve inlet and the expansion valve outlet, wherein the controller controls the valve element to position the valve element to allow flow through the pathway in an open position or to block flow through the pathway in a closed position. The restriction can be in the form of at least one orifice. The expansion valve can comprise a solenoid actuator connected to the valve element, and the valve element is movable in a linear direction from the open and closed positions by the solenoid actuator.

An exemplary embodiment of the invention provides a new type of metering device, a digitally controlled solenoid-capillary tube metering device, such as a digitally controlled solenoid-capillary tube expansion valve, or DCSCEV, which can be used in refrigeration systems.

With a given compressor, condenser, and evaporator of a refrigeration system, the DCSCEV could provide the maximum refrigerant flow of the refrigeration system, hence, it could provide refrigeration systems with maximum cooling with the same electric power usage. In other words, using a DCSCEV could provide a refrigeration system having a higher energy efficiency than systems using other metering devices, such as automatic expansion valves, thermostatic expansion valves, or capillary tubes.

The DCSCEV could be used in various refrigeration systems without regard to the refrigerant, the size (small or large cooling capacity) of the system, the environment temperature, or the refrigerated room or space temperature or cooling target temperature, of the desired system (refrigerating temperature or freezing temperature, or others).

The DCSCEV provides additional advantages. Compared to capillary tube metering devices, the DCSCEV is able to reduce or eliminate the friction loss of energy when refrigerant goes through the capillary tube, and, reduce or eliminate 'bubble' loss of energy. Bubble loss occurs when refrigerant passes through the capillary tube and because of pressure drop, the refrigerant vaporizing to gas. This gas bubble reduces the portion of refrigerant liquid and reduce the refrigeration effectiveness of the system.

By avoiding energy loss, present in the use of capillary tubes, by using DCSCEV, a refrigeration system can make use of this energy to yield, therefore, more liquid refrigerant and hence, increased refrigerant flow with higher energy efficiency.

Besides this, the DCSCEV refrigeration could provide an increased refrigerant liquid flow under the same working conditions as capillary tube systems, and achieve better system performance, and higher energy efficiency.

Compared to automatic thermostatic expansion valves, the DCSCEV is able to provide a bigger liquid refrigerant flow with the same electric energy usage, eliminate the sophisticated gear structure of automatic, or electronic expansion valves (ETV), which is very costly; eliminate the need for a step motor of sophisticated structure used in ETV; and eliminate the requirement of a high precision valve port.

Because the conventional expansion valves need to provide the precise amount of refrigerant liquid flow, the valve ports must be made with high accuracy, which unavoidably increases valve costs. Since the conventional expansion valves are controlled by using analogue technologies, the control abilities are not robust enough such that many sizes of valves are required to satisfy the demand of various refrigerants, power demands of systems, and different refrigeration temperatures. This increases the valve costs and limits the uses of particular valves. Because the conventional expansion valves need to have a precision valve port and cannot control the refrigerant flow in an accurate way, they are sometimes not suitable to be used in small refrigeration appliances.

The DCSCEV, because of its robust abilities of digital control, would not need sophisticated valve structures, and would require only a few sizes for various applications. The DCSCEV would have the advantages of simple valve structures, reduced sizes needed, reduced cost and be usable in a variety of refrigeration systems.

Numerous other advantages and features of the present invention will be become readily apparent from the following detailed description of the invention and the embodiments thereof, and from the accompanying drawings.

DETAILED DESCRIPTION

Figure 1:
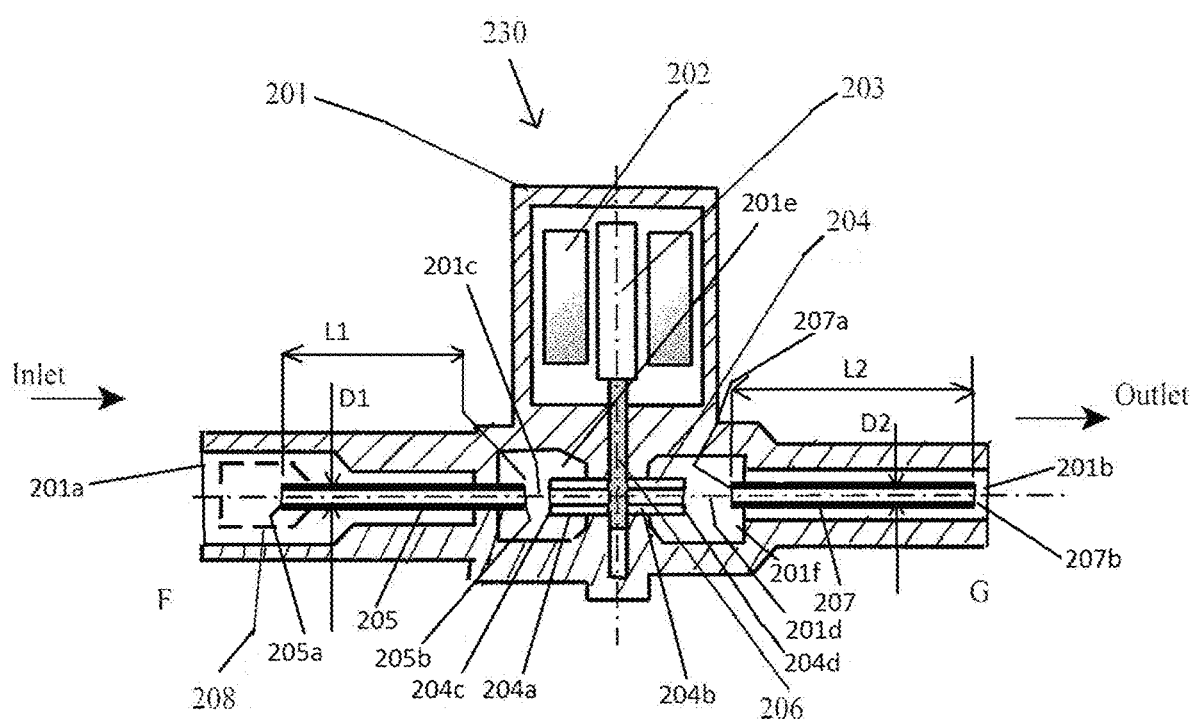
FIG. 1 is a schematic sectional view of a DCSECV according to one embodiment of the invention, shown in a closed configuration.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Ser. No. 16/672,371, filed Nov. 1, 2019.

FIG. 1 shows the structure of a valve 230, such as a solenoid capillary tube expansion valve 230 of a DCSCEV. The valve 230 is controlled by a controller 240 in the form of a printed circuit board (PCB) or other digital electronics device. The valve 230 can be digitally controlled to completely either open or close for selected durations according to rules set by the controller 240 in response to sensors.

The valve 230 includes a body 201 having a valve inlet 201a and a valve outlet 201b, a coil 202, a plunger 203, a seat 204 having an inlet seat tube 204a and an outlet seat tube 204b, a valve element such as a needle 206, an inlet body tube 205, an outlet body tube 207, and a filter 208. The inlet body tube 205 has a length L1 of preferably 40 mm with a diameter D1 of preferably 0.25 mm. The outlet body tube 207 has a length L2 of preferably 40 mm with a diameter D2 of preferably 0.25 mm. The inlet body tube 205, the outlet body tube 207, the inlet seat tube 204a and the outlet seat tube 204b can be capillary tubes.

Liquid refrigerant from the condenser 120 enters into the valve 230, passing through the filter 208 which is used to filter out the small articles in the liquid refrigerant, then, by the operation of the plunger 203 which is controlled by the controller 240, and the valve seat 204, and the needle 206, which is moved by the plunger 203, open or close the refrigerant flow, as well as the refrigerant flow in the refrigeration system.

FIG. 1 shows the valve 230 in a closed configuration with the needle 206 moved downward by the plunger 203 to be positioned between the inlet seat tube 204a and the outlet seat tube 204b.

The inlet and outlet body tubes 205, 207 are used to avoid that the liquid refrigerant impact occurring when the valve opens. Without these tubes of small inner diameter, during compressor running, the refrigerant in the condenser 120 has a very high pressure; and as soon as the valve 230 opens, the pressure would be lost dramatically, which results in the impact for the compressor 110 and the condenser 120. By using body tubes 205, 207 of small inner diameter, the impact could be reduced significantly or eliminated. Also, the use of small diameter body tubes 205, 207 makes the time of valve being open longer and reduces the frequency of valve opening and closing. This controls the valve closing time/opening time as 15-25 seconds closed/3~7 seconds open, when the system is subject to steady running status. Thus, such a frequency could ensure the valve has a long term working life.

The inlet body tube 205 has an inlet 205a in communication with the valve inlet 201a and an outlet 205b. The outlet body tube 207 has an inlet 207a and an outlet 207b in communication with the valve outlet 201b. The inlet seat tube 204a has an inlet 204c, and the outlet seat tube 204b has an outlet 204d. There is a first gap 201c between the outlet 205b of the inlet body tube 205 and the inlet 204c of the seat tube 204a and a second gap 201d between the outlet 204d of the outlet seat tube 204b and the inlet 207a of the outlet body tube 207. The first gap 201c is open into a first cavity 201e of the body 201. The second gap 201d is open into a second cavity 201f of the body 201.

As an alternate to the use of the body tubes 205, 207, small orifices in plates within the body 201 could be used. The seat tubes 204a, 204b could also be replaced by an orifice.

Figure 1A:
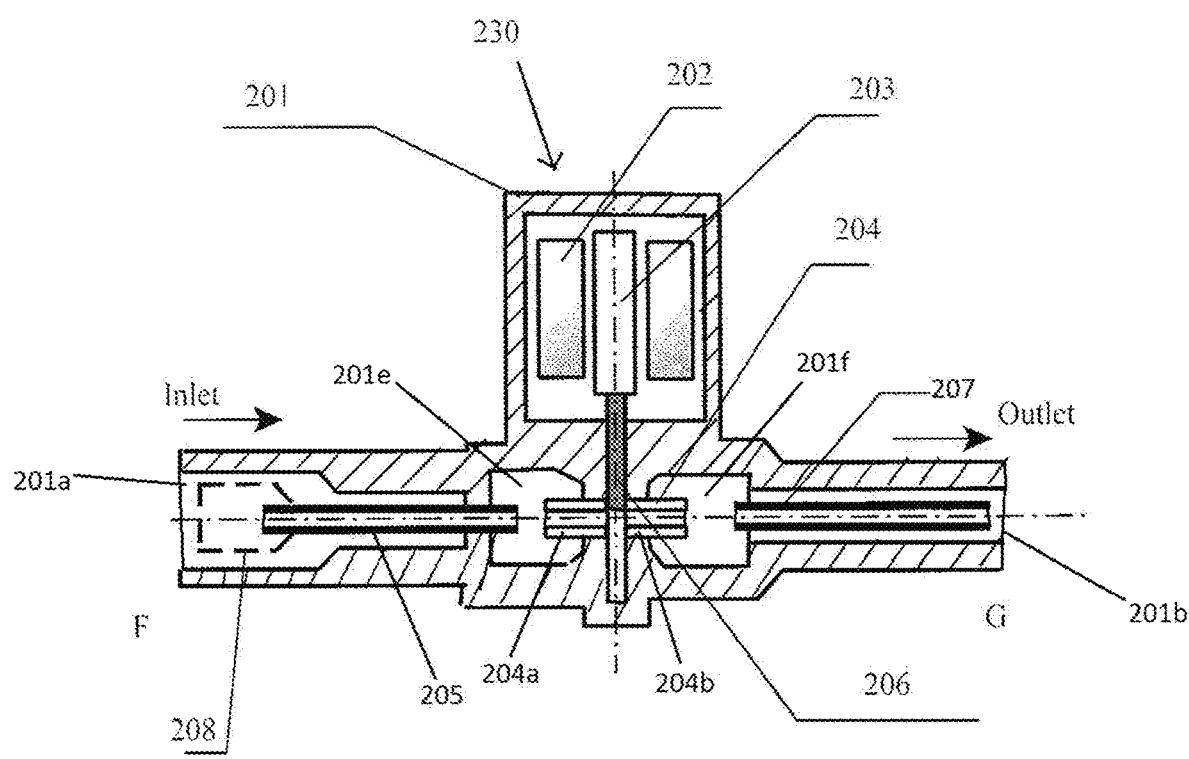
FIG. 1A is a schematic sectional view of the DCSECV of FIG. 1, shown in an open configuration.

FIG. 1A shows the needle 206 retracted upwardly by the plunger 203 to open the seat between the inlet seat tube 204a and the outlet seat tube 204b to allow flow through the valve 230. The refrigerant will flow through the valve inlet 201a, through the filter 208, through the inlet body tube 205, through the cavity 201e, through the seat 204, through the cavity 201f, through the outlet body tube 207 and out of the valve outlet 201b.

Figure 2:
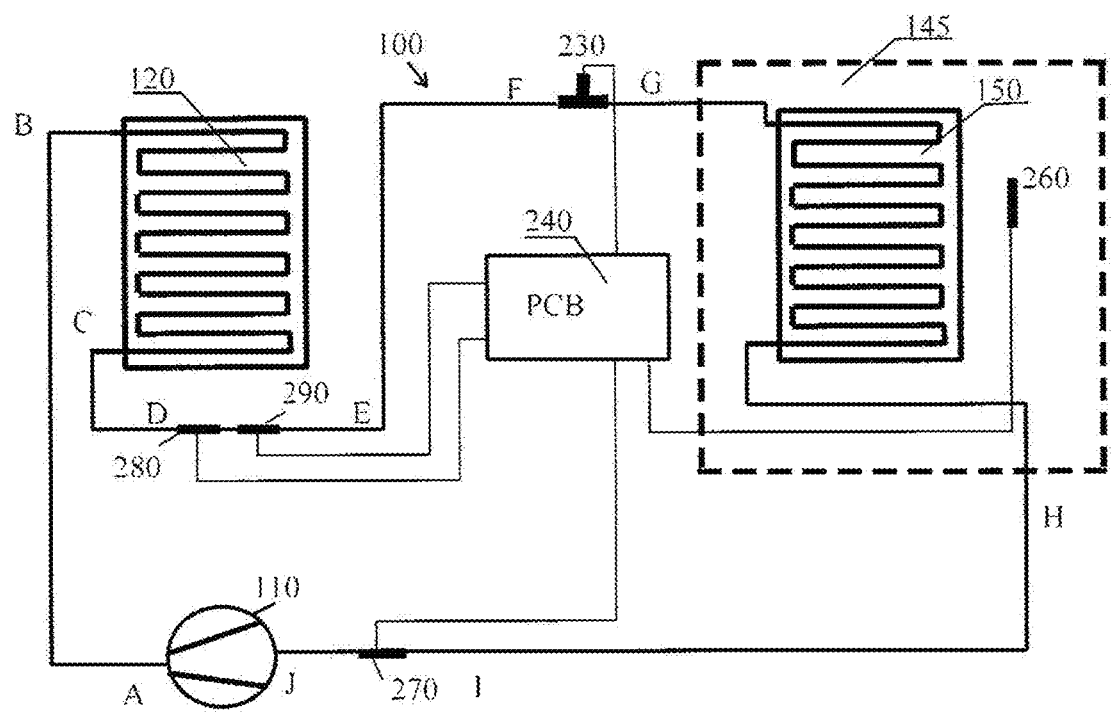
FIG. 2 is a schematic diagram of a first refrigeration system i.

FIG. 2 shows a refrigeration system which uses the DCSCEV 230 of FIG. 1 as the refrigerant metering device.

The refrigeration system 100 includes a compressor 110, a condenser 120, the refrigerated room or space 145, an evaporator 150, the valve 230, the controller 240, a temperature sensor 260 of the refrigerated area 245, an evaporator pressure sensor 270, a temperature sensor 280 of the refrigerant in the outlet of the condenser, and a pressure sensor 290 of refrigerant in the outlet of the condenser.

The refrigeration operation could be described as follow: the compressor 110 delivers compressed refrigerant into the condenser 120, (point B), in the condenser 120 the refrigerant condenses into a liquid state (liquid phrase). The pressure and temperature of condensed refrigerant is measured by sensors 280 and 290 and signals are sent to the controller 240, then the controller 240 gives a signal to the valve 230 to open or close, to control the refrigerant flow based on control rules (see below). The refrigerant from point G enters into evaporator 150 in which the refrigerant absorbs the heat of the refrigerating room or space and changes state to become gas. The refrigerant gas returns to point J. The sensor 270 is used to sense the refrigerant pressure of evaporator; and the sensor 260 is used to sense the temperature signal of the refrigerating space 145 and send a corresponding signal to the controller 240.

The valve operation is described as: the controller 240 receives the signal of pressure and temperature of refrigerant in condenser by sensor 280 and sensor 290, and the signal of room temperature and pressure of refrigerant in evaporator by senor 260 and sensor 270, to calculate the sub-cool of refrigerant in condenser and target super heat of refrigerant in the evaporator (see below). Based on the system control rules, the controller 240 would control the valve 230, such as the DESCEV to open or close in order for the refrigeration to run steadily.

When refrigerant temperature is lower than its saturation temperature, it is called the refrigerant is in "sub-cool." It is desirable that all of refrigerant exiting the condenser be in liquid phrase and the necessary condition for refrigerant being liquid phrase is its sub-cool >0° F. The sub-cool must be maintained in a suitable range: too small sub-cool could not ensure all of refrigerant in liquid phrase; too much sub-cool would result in increased energy consumption. Experimental data show an advantageous sub-cool range having the low point of sub-cool being 2~3° F., and the high point is 4~6° F.

The target super heat is defined as the room temperature minus the saturation temperature of refrigerant in the condenser, and the saturation temperature of refrigerant is also obtained from the refrigerant pressure in the evaporator and the refrigerant pressure—temperature chart based on the refrigerant pressure in the evaporator. The refrigerant saturation temperature, or the refrigerant evaporating temperature in the evaporator should be lower than the room temperature, otherwise, the refrigerant could not evaporate. Meanwhile, because of heat transfer influence, the desired evaporating temperature should be 20° F. or more lower than the room or space temperature, otherwise the heat transfer is not sufficiently efficient. On the other hand, the desired evaporating temperature should not be too low as to make the energy efficiency of the refrigeration system too low. An advantageous evaporating temperature is from 35° F.~25° F. lower than the room or space temperature, and, from the pressure—temperature data of the refrigerant, the corresponding desired pressure of refrigerant can be determined.

The room or space temperature set points have a dead band with a low point and a high point. The designer of the controller, such as a PCB designer, or the users of the controller, must specify the low point and the high point of parameters for the controller before the controller is used, which is called the parameter setting.

The sub cool and the target super heat are also parameters which are used to control the valve opening or closing. The designer of the controller, such as a PCB designer, or the users of the controller, must specify the low point and the high point of parameters for the controller before the controller is used, further parameter setting.

From above discussion, the control rules could be described as:

Rule 1. If the cooled room or space temperature ≥high point of temperature set point, which is set in controller 240, then the compressor starts and keeps running. After delay of 3~5 seconds (the delay time could be made adjustable) the valve 230 closes.

For example, if the cooled room or space is at a current temperature at 45° F., and the room or space temperature setting high point, set in the controller 240, is 40° F., then the compressor starts and continues running, and after 3~5 seconds of compressor running, the valve 230 closes.

The 3~5 seconds delay is for the easier startup of the compressor. Generally in order to avoid damage, a compressor is started without loading. For achieving that, the valve 230 stays open during the period when the compressor is powered off. When the valve 230 is open, the refrigerant has the same pressure in both the compressor outlet pipe and the compressor inlet pipe, which is called "pressure balance." When the compressor starts, because of the pressure balance, the compressor will be unloaded during startup and easier to start.

The compressor startup takes generally about 3~5 seconds. After the 3~5 seconds delay for compressor start up, the valve 230 closes, and after the valve 230 closes, the refrigerant in the condenser will be at a high pressure and the refrigerant in the evaporator will be at a low pressure, thus the refrigerating conditions will be formed.

If for example, the coded room or space is at a current temperature of 45° F., and the coded room or space temperature setting high point is 40° F., then the compressor starts and continues to run. After 3~5 seconds of compressor running, the valve 230 closes. If after the valve 230 closes, and the coded room or space temperature is for example only 43° F., the compressor continues to run and the refrigerant pressure in the condenser will increase. As soon as the pressure reaches the saturation point the refrigerant will be condensed. Furthermore, as the pressure becomes higher, the refrigerant becomes liquid and achieves sub coded status.

As soon as the refrigerant sub cool reaches the high point of the setting, which is set in controller 240, and the target super heat (see below) reaches the high point of setting, which is set in controller 240, the valve 230 will open for the refrigerant flow. At this time the refrigerant pressure in the condenser will be dropping, as are the sub cool and the target super heat. At this time, since the liquid refrigerant flows into the evaporator and begins evaporating, the room or space temperature will be also reduced.

As soon as the refrigerant sub cool drops to the low point of the setting, which is set in controller 240, or the target super heat drops to the low point of setting, which is set in controller 240, the valve 230 closes and the refrigerant pressure in the condenser and sub cool will increase again.

Rule 2. If the cooled room or space temperature ≤low point of temperature setting, which is set in controller 240, then the compressor stops and the valve 230 opens.

For example, if the cooled room or space is at a current temperature of 33° F., and the cooled room or space temperature low point is 33° F., which is set in controller 240, then the compressor stops running and the valve 230 opens.

Rule 3. If the sub cool≥the high point of set point, which is set in controller 240, and the target super heat ≥the high point of set point, which is set in controller 240, the valve 230 opens (refrigerant flow is allowable).

Rule 4. If the sub cool ≤the low point of set point, which is set in controller 240, or the target super heat ≤the low point of set point, which is set in controller 240, the valve 230 closes (stops or blocks refrigerant flow).

Figure 3:
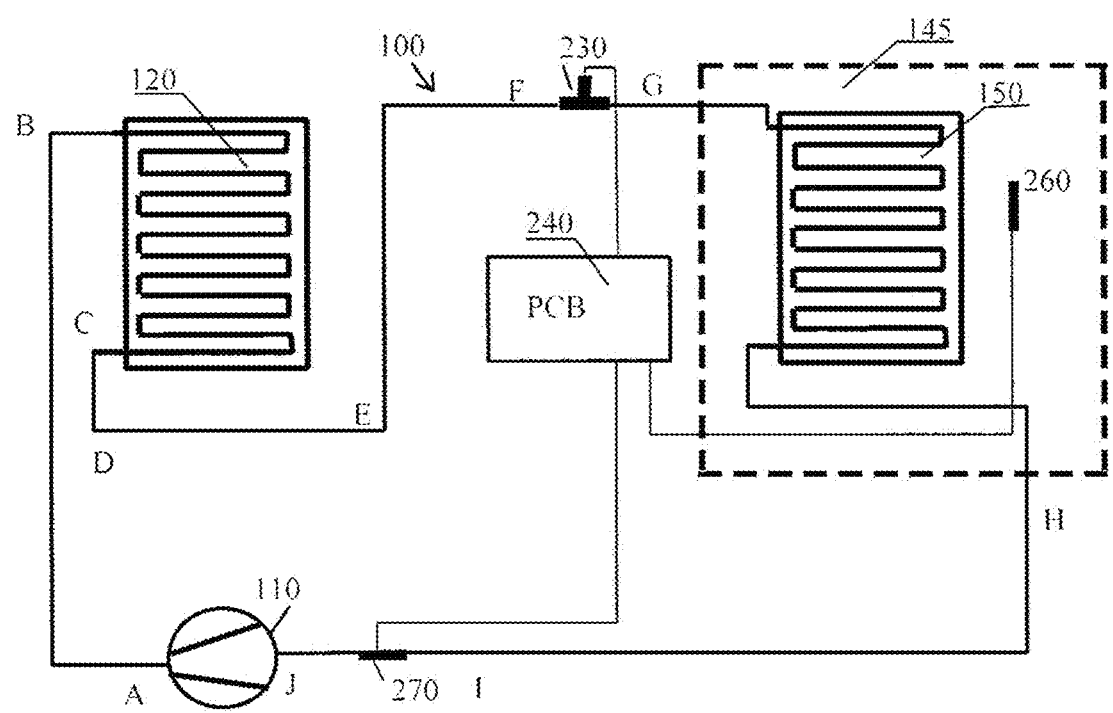
FIG. 3 is a schematic diagram of a second refrigeration system.
Figure 4:
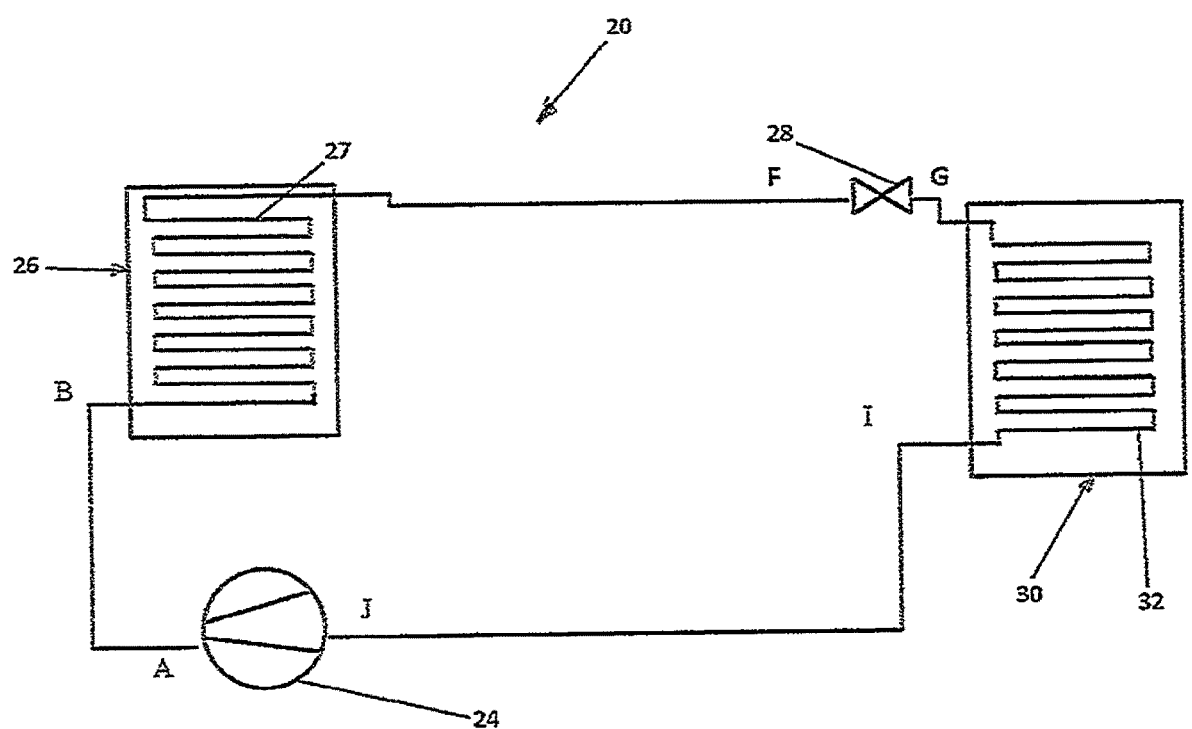
FIG. 4 is a schematic diagram of a prior art refrigeration system.

For refrigeration systems of small appliances, especially, for those having refrigerant amount or charge ≤5 LB, the sensor 280 and the sensor 290 could be eliminated to reduce cost. The system is shown by FIG. 3. For the system 100' of FIG. 3, the control rules become:

Rule 1. If the room temperature ≥high point of set point, which is set in controller 240, of cooled room or space temperature, then the compressor starts and continues to run. After delay of 3~5 seconds (the time period could be made adjustable), the valve 230 closes.

Rule 2. If the cooled room or space temperature ≤low point of set point of the cooled room or space temperature, which is set in controller 240, then the compressor stops, and the valve 230 opens.

Rule 3. If the target super heat the high point of set point, which is set in controller 240, the valve 230 opens (refrigerant flow is allowable).

Rule 4. If the target super heat 5 the low point of set point, which is set in controller 240, the valve 230 closes (stops or block refrigerant flow).

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A refrigeration system, comprising:
   a compressor;
   a condenser;
   an expansion valve having a body with an expansion valve inlet and an expansion valve outlet;
   an evaporator; and
   a controller;
   wherein an outlet of the compressor is flow-connected to an inlet of the condenser, an outlet of the condenser is a flow-connected to the expansion valve inlet, the expansion valve outlet is flow-connected to an inlet of the evaporator, and an outlet of the evaporator is flow-connected to an inlet of the compressor; and
   wherein the expansion valve body has a pathway comprising an inlet body tube flow-connected to the expansion valve inlet, and an outlet body tube flow-connected to the expansion valve outlet, wherein the inlet body tube has an inlet body tube outlet and the outlet body tube has an outlet body tube inlet wherein the inlet body tube and the outlet body tube have a common longitudinal axis; and
   wherein the expansion valve comprises a valve element that is selectively positionable between the inlet body tube outlet and the outlet body tube inlet, positionable in a perpendicular direction to the common longitudinal axis of the inlet body tube and the outlet body tube, wherein the controller controls the valve element to position the valve element to allow flow through the pathway in an open position or to block flow through the pathway in a closed position.

2. The system according to claim 1, wherein the pathway further comprises a valve seat that is comprised of an inlet seat tube, and an outlet seat tube, and the inlet body tube outlet is spaced from the inlet of the inlet seat tube by a first gap, and the outlet of the outlet seat tube is spaced from the outlet body tube inlet by a second gap, wherein the valve element is positionable between the inlet seat tube and the outlet seat tube.

3. The system according to claim 2, wherein the body comprises a first chamber open to the first gap and a second chamber open to the second gap.

4. The system according to claim 1, wherein the expansion valve comprises a solenoid actuator connected to the valve element, and the valve element is movable in the perpendicular direction from the open and closed positions by the solenoid actuator.

5. The system according to claim 3, wherein the expansion valve comprises a solenoid actuator connected to the valve element, and the valve element is movable in the perpendicular direction from the open and closed positions by the solenoid actuator.

6. An expansion valve for a refrigeration system, comprising:
   a body with an expansion valve inlet and an expansion valve outlet;
   the body having a pathway comprising an inlet body tube flow-connected to an expansion valve inlet, and an outlet body tube flow-connected to an expansion valve outlet, wherein the inlet body tube has an inlet body tube outlet and the outlet body tube has an outlet body tube inlet, wherein the inlet body tube and the outlet body tube have a common longitudinal axis;
   wherein the expansion valve comprises a valve element that is selectively positionable between the inlet body tube outlet and the outlet body tube inlet, to allow flow through the pathway in an open position or to block flow through the pathway in a closed position, positionable in a perpendicular direction to the common longitudinal axis of the inlet body tube and the outlet body tube.

7. The valve according to claim 6, wherein the pathway further comprises a valve seat that is comprised of an inlet seat tube, and an outlet seat tube, and the inlet body tube outlet is spaced from the inlet of the inlet seat tube by a first gap, and the outlet of the outlet seat tube is spaced from the outlet body tube inlet by a second gap, wherein the valve element is posittionable between the inlet seat tube and the outlet seat tube.

8. The valve according to claim 7, wherein the body comprises a first chamber open to the first gap and a second chamber open to the second gap.

9. The valve according to claim 8, wherein the expansion valve comprises a solenoid actuator connected to the valve element, and the valve element is movable in the perpendicular direction from the open and closed positions by the solenoid actuator.

10. The valve according to claim 6, wherein the expansion valve comprises a solenoid actuator connected to the valve element, and the valve element is movable in the perpendicular direction from the open and closed positions by the solenoid actuator.

11. A refrigeration system, comprising:
a compressor;
a condenser;
an expansion valve having a body with an expansion valve inlet and an expansion valve outlet;
an evaporator; and
a controller;
wherein an outlet of the compressor is flow-connected to an inlet of the condenser, an outlet of the condenser is a flow-connected to the expansion valve inlet, the expansion valve outlet is flow-connected to an inlet of the evaporator, and an outlet of the evaporator is flow-connected to an inlet of the compressor wherein the expansion valve inlet and the expansion valve outlet have a common longitudinal axis; and
wherein the expansion valve body has a pathway comprising a restriction flow-connected to the expansion valve inlet, and to the expansion valve outlet; and
wherein the expansion valve comprises a valve element that is selectively positionable between the expansion valve inlet and the expansion valve outlet, positionable in a perpendicular direction to the common longitudinal axis of the expansion valve inlet and the expansion valve outlet, wherein the controller controls the valve element to position the valve element to allow flow through the pathway in an open position or to block flow through the pathway in a closed position.

12. The system according to claim 11, wherein the restriction comprises at least one orifice.

13. The system according to claim 11, wherein the expansion valve comprises a solenoid actuator connected to the valve element, and the valve element is movable in the perpendicular direction from the open and closed positions by the solenoid actuator.

14. The system according to claim 12, wherein the expansion valve comprises a solenoid actuator connected to the valve element, and the valve element is movable in the perpendicular direction from the open and closed positions by the solenoid actuator.

\* \* \* \* \*